April 30, 1940.　　　J. J. STINES　　　2,198,639

VALVE STRUCTURE

Filed March 25, 1937　　　3 Sheets-Sheet 1

INVENTOR
JOHN J. STINES
BY Alfred R. Fuchs
ATTORNEY

April 30, 1940.  J. J. STINES  2,198,639
VALVE STRUCTURE
Filed March 25, 1937  3 Sheets-Sheet 2
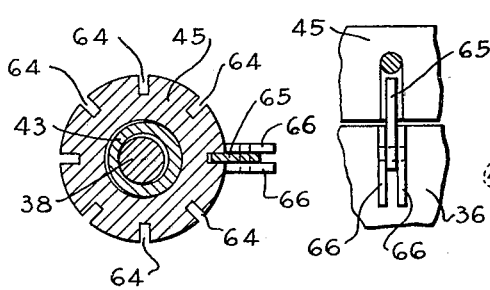
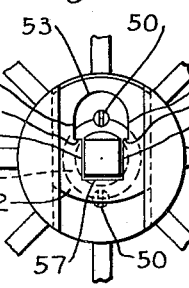
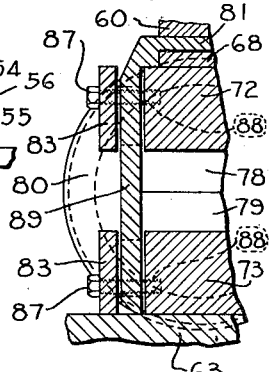
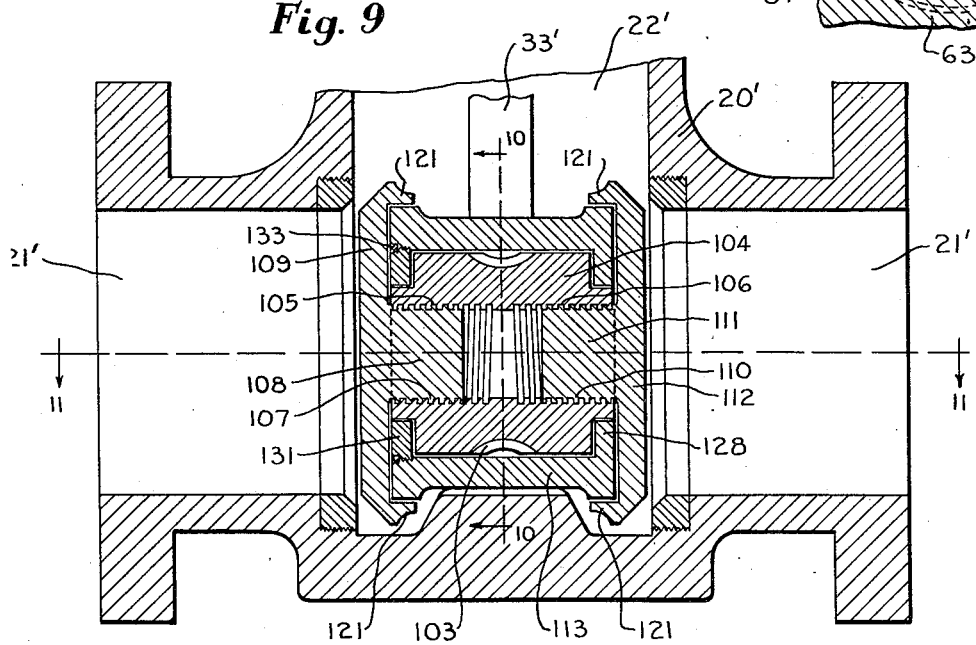
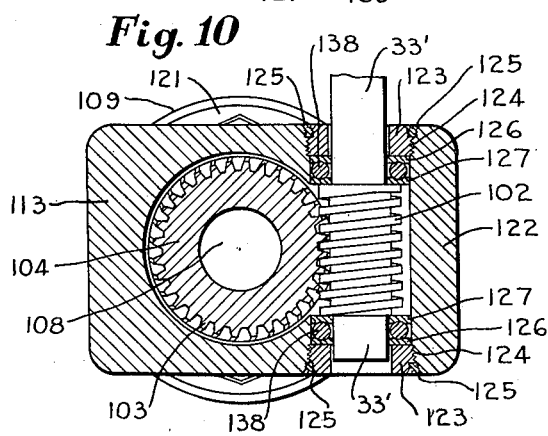
INVENTOR
JOHN J. STINES
BY Alfred R. Fuchs
ATTORNEY April 30, 1940.　　J. J. STINES　　2,198,639
VALVE STRUCTURE
Filed March 25, 1937　　3 Sheets-Sheet 3

INVENTOR
John J. Stines
BY Alfred R. Fuchs
ATTORNEY

Patented Apr. 30, 1940

2,198,639

UNITED STATES PATENT OFFICE 2,198,639

VALVE STRUCTURE

John J. Stines, Kansas City, Mo.

Application March 25, 1937, Serial No. 133,039

14 Claims. (Cl. 251—68)

My invention relates to valves, and more particularly to gate valves.

In gate valves, particularly large size valves, such as used on oil and gas pipe lines, much difficulty is experienced in opening and closing the valves due to the fact that the closure members, or gates, are operated in such a manner by the actuating means therefor, that when moving toward and away from the valve seats, these closure members are also moved transversely of the valve seats, causing an extremely great amount of friction, which often makes it impossible to move the valve either into or out of closing position, and which causes an undue amount of wear on the valve closure member and on the valve seat. This difficulty exists because, in substantially all valves of this character, the valve stem is rotated to move the valve closure members into and out of position opposite the valve seats and continues to be rotated in the same manner to move the closure members into engagement with the valve seats, means being depended upon, within the valve casing, to change the direction of movement of the closure members, from one in the direction of the length of the valve stem, to one transversely of the valve stem, and vice versa.

It is one of the principal purposes of my invention to separate the two operations; that of moving the gate members, or valve closure members, into or out of position opposite the valve seats, and that of moving said valve closure members, or gate members, toward and away from the valve seats; so that, as said closure members move in a direction transverse to the valve seats, the same are entirely out of engagement with said valve seats, and when said closure members, or gate members, are moved into seating position, or out of seating position, with relation to said valve seats, this movement is a straight line movement toward and away from said valve seats, and not in any other direction whatsoever.

This prevents wear on the valve seats and the valve closure members, and also makes the operation of the valve absolutely certain and makes the valve easier to operate, as it is positive in operation both in its movement into and out of alignment with the seat members, and toward and away from the seat members. Furthermore, it is a purpose of my invention to provide an apparatus of the above mentioned character in which a rotatable operating member is utilized to obtain both the longitudinal movement of the valve stem to move the valve closure members, or gate members, into and out of position opposite the valve seats and to obtain rotary movement of the valve stem without any longitudinal movement thereof, to move said valve closure members, or gate members, into engagement with the seats and out of engagement with the seats.

More particularly my invention comprises a valve casing, from which a valve stem projects, which is cooperatively related to a hand wheel, so that the hand wheel will advance the valve stem lengthwise of itself in either direction, dependent upon the rotation of the hand wheel, or will rotate said valve stem when this is desired, said valve stem being provided with means for actuating wedges upon the rotation thereof to move the valve closure members into closing position, and with means for moving said valve closure members out of closing position upon rotation of said valve stem.

It is another purpose of my invention to provide an apparatus of the above mentioned character, in which the means for operating the valve comprises a member that is movable from one position to another position in order to move the valve stem lengthwise of itself without rotating the same, or for rotating said valve stem without moving the same lengthwise of itself. Furthermore, my improved means comprises a member that is movable to such alternative positions, so inter-related with the valve stem and the rotatable member for operating the valve stem, that there is only one position in which the relationship of this member and said valve stem can be changed in order to rotate said valve stem with said rotatable member, this being at the time when the closure members of the valve mechanism are in proper position opposite the valve seats.

It is a further purpose of my invention to provide a valve of the above mentioned character that can be locked in any desired set position thereof, and furthermore to provide such a valve mechanism that can be operated either directly by a screw-threaded connection, or through a worm drive, to move the valve closure members into and out of engagement with the valve seat.

It is a further purpose of my invention to provide a valve of the above mentioned character, in which pressure on one side of the valve, without a corresponding pressure on the other side thereof, will not in any way affect the operation of the valve or interfere therewith, the valve being as readily operable with a high unbalanced pressure on one side thereof, as with no pressure, or equal pressure, on opposite sides thereof.

Other objects and advantages of my invention will appear as the description of the drawings proceeds. I desire to have it understood, however, that I do not intend to limit myself to the particular details shown or described, but that I intend to include as part of my invention all such modifications and changes as would appear to a person skilled in the art and as would fall within the scope of the claims.

In the drawings:

Fig. 5 is a section taken on the line 5—5 of Fig. 1.

Fig. 6 is a fragmentary view partly in elevation and partly in section, taken on the line 6—6 of Fig. 1.

Fig. 7 is a fragmentary top plan view of the rotatable operating member.

Fig. 8 is a fragmentary sectional view taken on the line 8—8 of Fig. 1.

Fig. 9 is a fragmentary vertical sectional view of a modified form of valve.

Fig. 10 is a section taken on the line 10—10 of Fig. 9, the valve casing being omitted.

Figure 1:
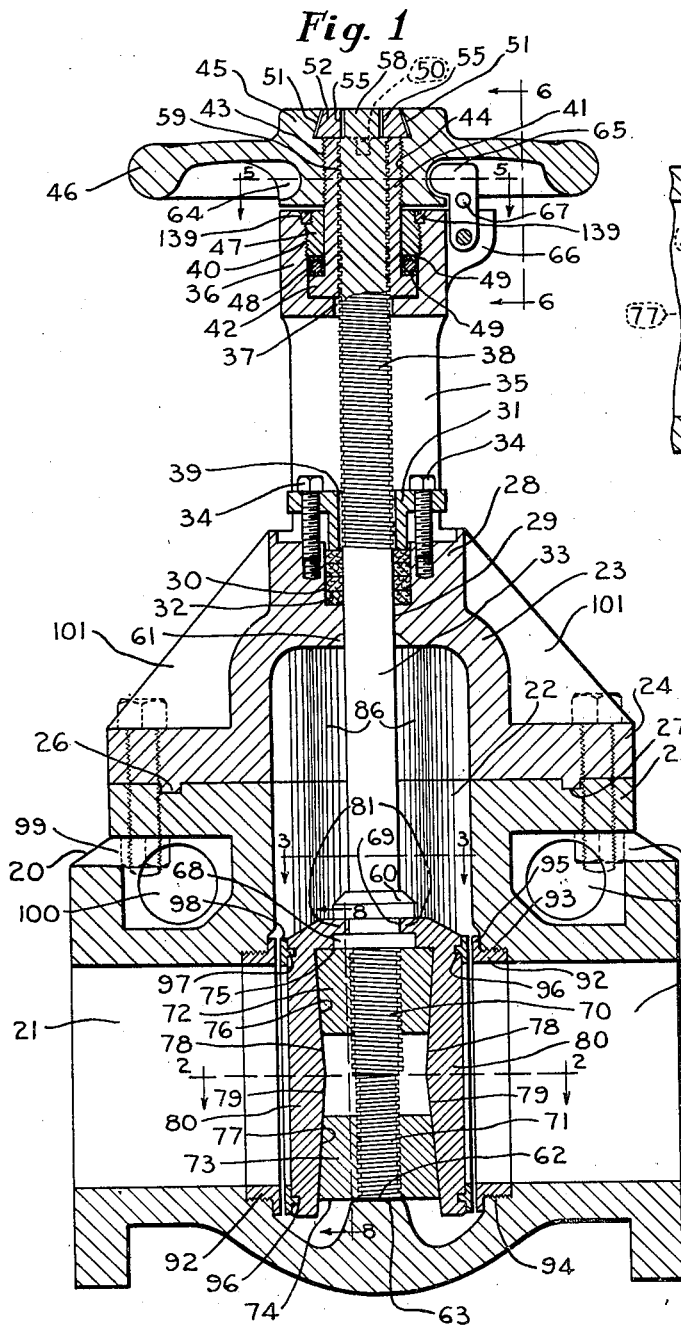
Fig. 1 is a vertical sectional view through one form of my improved gate valve.
Figure 2:
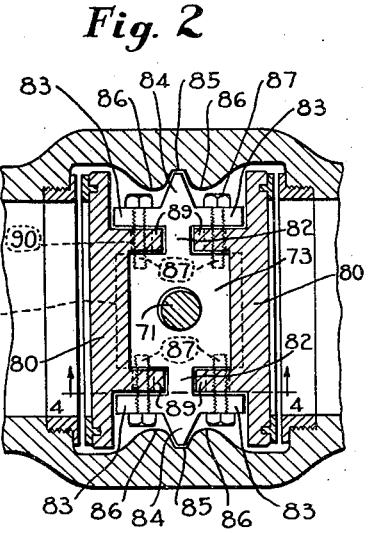
Fig. 2 is a section taken on the line 2—2 of Fig. 1.
Figure 3:
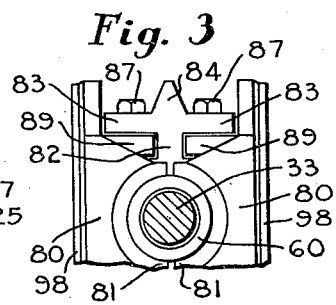
Fig. 3 is a fragmentary section taken on the line 3—3 of Fig. 1, the valve casing being omitted.
Figure 4:
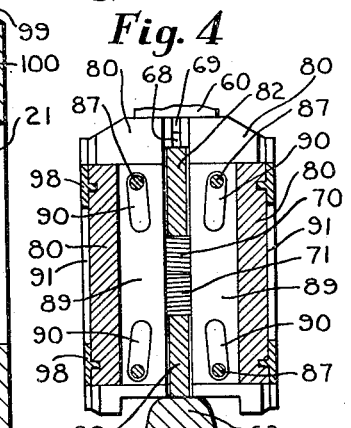
Fig. 4 is a fragmentary section taken substantially on the line 4—4 of Fig. 2.
Figure 11:
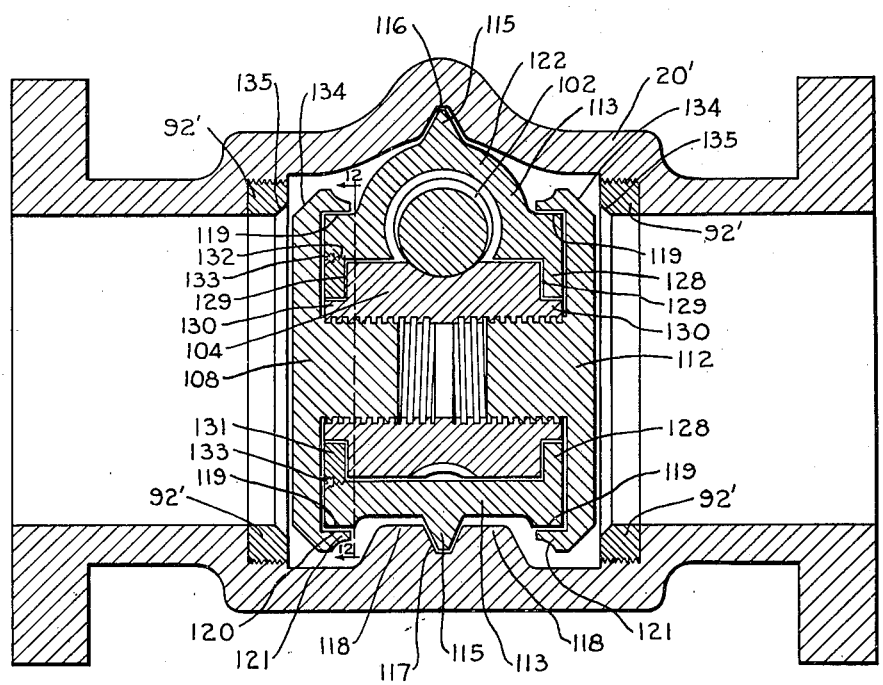
Fig. 11 is a section taken on the line 11—11 of Fig. 9.

Referring in detail to the drawings, in Figs. 1 to 8, inclusive, is shown one form of my invention, the valve being shown therein as comprising a valve casing having a body portion 20, which is provided with fluid passages 21 leading to a central chamber in said body portion, by means of which said passages 21 are connected when the valve is in open position. Said valve is provided with a chamber 22 extending substantially at right angles to the passages 21, said chamber 22 being formed partly in the body portion 20 and partly in an upper detachable cap portion 23 provided on said body portion 20, said cap portion 23 being detachably secured to the body portion 20 by means of securing devices extending through the flanges 24 and 25 provided on the cap portion 23 and body portion 20, respectively, an annular rib 26 being provided on the flange 24 seating in an annular groove 27 on the flange 25 for sealing the joint between the cap portion 23 and the body portion 20. Thus the valve comprises a chamber 22 and passages 21 leading into a central space, through which communication is had between said chamber 22 and the passages 21, and one passage 21 with the other passage 21.

The cap portion 23 is provided wtih a boss 28, which is provided with a central passage, or bore, 29 therein that opens into a packing recess 30 and a packing gland 31 is provided for compressing the packing material 32 around the valve stem 33 extending through the bore, or passage, 29 so as to provide a fluid tight joint between said valve stem and the valve casing, the packing gland 31 being secured in packing compressing position by means of the screw-threaded securing members 34.

Extending upwardly from the boss 28 are spaced standards 35 forming a bifurcated upwardly extending portion on said valve cap portion 23 that terminates in a socket 36, said socket having an opening 37 therein, through which the screw-threaded portion 38 of the valve stem 33 freely passes, the same being true also of the passage 39 in the packing gland 31.

An internally screw-threaded portion 40 is provided on the wall of the socket member 36 and a sleeve 41 is provided with a flange 42 that fits rotatably within the socket portion 36, said sleeve being provided with an externally screw-threaded portion 43 that screw-threadedly engages the internally screw-threaded portion 44 on the rotatable operating member 45 in the form of a hand wheel having an annular rim portion 46. An externally screw-threaded sleeve 47 engages the internal screw-threads 40 on the socket member 36, and bearing balls 48 are mounted between said sleeve 47 and the flange 42, suitable washers 49 of friction reducing metal being provided between said balls 48 and the sleeve 47 and flange 42, respectively.

It will be noted that by the connection described above, the hand wheel, or rotatable operating member, 45 is rotatable relative to the valve casing, but not endwise movable relative thereto. Also it will be noted that due to the ball bearing mounting of said rotatable valve operating member 45, the same will turn easily relative to the valve casing and that the valve stem 33 will turn relatively much less readily relative to the valve casing, because of the friction created by the packing 32 against the valve stem, due to compression by means of the packing gland 31. In order to prevent any possible rotation, or unscrewing, of the hand wheel, or rotatable operating member, 45 from the sleeve 41, a pair of set screws 50 is provided that engage in suitable openings in the hub portion of the hand wheel 46 and the sleeve 41.

Mounted in an undercut guideway 51 in the hub portion of the rotatable operating member 45 is a slide 52, the same having inclined side walls to provide a dove-tailed connection with the dovetailed groove, or guideway, 51 provided in the hub portion of said rotatable member 45.

The slide 52 is provided with an opening therein that has a curved wall portion 53 that is of a slightly larger diameter than the outer diameter of the screw-threaded portion 38 of the stem 33, straight wall portions 54 that are spaced a distance apart equal to the diameter of the curved portion 53, straight wall portions 55 inwardly offset relative to the portions 54 to provide shoulders 56, and a straight end wall 57 perpendicular to the walls 55. The distance from the meeting point of the wall portion 55 and the shoulder 56 from the center of the arc of the curved portion 53 is at least as great as the radius of said arc, so that said screw-threaded portion 38 of the valve stem can freely pass through the partially circular enlarged portion of the opening in said slide 52. However, said screw-threaded portion cannot pass through the smaller, substantially rectangular portion of said opening having the side wall 55 and the end wall 57. The valve stem is provided with a squared end portion 58, which is reduced in size and is of very slightly less transverse dimension than the distance between the side walls 55 of the reduced portion of the opening in the slide 52. Thus, this reduced portion of said opening can be slidably engaged with the reduced portion 58 on the valve stem when said portion of the valve stem and said slide are in alignment. Such engagement of the parts is shown in Figs. 1 and 7. However, if the slide 52 is moved so as to align the enlarged portion of the opening in the slide with the valve stem, the valve stem can readily pass through said enlarged portion of the opening.

When the parts are in the position shown in Fig. 1 rotation of the rotatable operating member, or hand wheel, 45 will rotate the valve stem therewith in whatever direction said rotatable operating member is turned. If the slide 52 is moved to its alternative position, however, the valve stem and the rotatable operating member 45 will no longer rotate together, but instead, upon rotation of the member 45 in the proper direction, the internal screw-threads 59 on the sleeve 41 engaging with the external threads 38 on the stem 33 will cause said valve stem to be moved longitudinally out of the casing and through the opening in the slide 52 so as to project from the rotatable operating member 45, this continuing as rotation of the operating member, or hand wheel, 45 is continued, until the annular projection 60 on the valve stem 33 engages in the correspondingly formed recess 61 in the cap member 23. It will be noted that during this operation, only longitudinal, or axial, movement of the valve stem 33 takes place, there being no rotation of the valve stem, due to the fact that the screw-threads 38 and screw-threads 59 engage with each other relatively loosely, and in view of the fact that the packing material 32 exerts friction on the surface of the valve stem 33 so as to hold the same against such rotation, as well as other parts, which will be described below.

It will also be noted that when the parts are in the position shown in Figs. 1 and 7, the valve stem will be rotated, but will not be moved longitudinally of itself because the inner end 62 of the valve stem 33 is in engagement with the projection 63 on the inner surface of the valve casing body 20 and the shoulder formed between the reduced end portion 58 and the threaded portion 38 is in engagement with the bottom face of the slide 52, which, in turn, is dove-tailed in the hand wheel 45, said hand wheel being held against endwise movement relative to the casing by means of the flange 42 thereon. It will also be noted that it is only in the position of the parts shown in Fig. 1, that the slide can be moved to engage the reduced portion of the opening in said slide with the reduced end portion 58 of the valve stem. This is of considerable importance, as it assures the proper location of the valve closure members relative to the valve seats at the time that the valve is to be closed. It is also assurance that there will be no transverse movement of the closure member relative to the valve seat when engagement of the valve seat by said closure members takes place.

Said hand wheel, or rotatable operating member, is further provided with a series of recesses 64 in the hub portion thereof, with any of which a pivoted locking finger 65 is adapted to engage, said locking finger being pivotally mounted between a pair of ears 66 provided on the socket portion 36, and being provided with an opening 67 therein, through which a padlock can be passed to prevent movement of the lock out of locking position. It will be obvious that the locking finger can be utilized to lock the valve operating member, and thus the valve, in substantially any adjusted position thereof.

The portion of the valve stem 33 that lies within the valve casing is provided with the previously mentioned enlargement 60 and an annular enlargement 68 spaced from the enlargement 60 to provide an annular groove 69 between said enlargements. Beyond the enlargements the stem portion 33 is provided with an externally threaded portion 70, which is threaded to correspond with the threads on the portion 38, and a reduced threaded portion 71 that is threaded in the opposite direction to the threads on the portion 38.

Screw-threadedly engaging the portion 70 is a wedging member 72 that is internally threaded with a thread corresponding to the thread on the portion 70, and mounted on the screw-threaded portion 71 is a wedging member 73 that is internally threaded to receive said screw-threaded portion 71, and in a corresponding manner to said screw-threaded portion 71. It will thus be seen that if the valve stem 33 is rotated in a given direction and the members 72 and 73 are held against rotation, said members 72 and 73 will move in opposite directions lengthwise of the valve stem 33. It will also be noted that, when the wedging members 72 and 73 are in the position shown in Fig. 1, the face 74 of the wedging member 73 will engage the projection 63 and the face 75 of the wedging member 72 will engage the annular enlargement 68 on the valve stem, thus limiting the movement of said members 72 and 73 away from each other. When the operating member 45 is rotated with the reduced portion of the opening in the slide, in engagement with the reduced end 58 of the valve stem in a counter-clockwise direction, looking down on the top of said operating member 45, said members 72 and 73 being held against rotation, these will be moved toward each other, while if the rotation of the operating member, or hand wheel, 45 is in a clockwise direction, the members 72 and 73 will be moved away from each other until their limiting position, shown in Fig. 1, is reached.

The wedging members 72 and 73 are provided with flat inclined wedging faces 76 and 77, respectively, which engage with similarly inclined wedging faces 78 and 79 on the gate members, or valve closure members, 80. Said gate members, or valve closure members, 80 are provided with flanges 81 that are received in the annular groove 69 so that the shaft 33 is freely rotatable on said flanges 81, but upon longitudinal movement of the shaft 33, said members 80 will be moved longitudinally with said shaft 33.

Each of the wedging members 72 and 73 has a pair of radially extending arms 82 thereon, and each arm 82 is provided with a pair of flanges 83 extending in opposite directions from the arms 82 perpendicularly thereto, and with tapering lateral ribs, or projections 84 that extend substantially in alignment with the arms 82 and are slidably received in grooves 85 provided between pairs of rounding projections 86 on the inner face of the valve casing. The inter-engaging projections 84 and grooves 85 prevent any turning of the wedging members 72 and 73 during rotation of the valve stem 33, and also guide the valve mechanism within the valve casing during the longitudinal movement of the same with the valve stem 33. Pivot members 87 in the form of bolts, extend through suitable openings in the flanges 83 and are received in screw-threaded openings 88 in the body portions of the wedging members 72 and 73.

The closure, or gate, members 80 are provided with rearwardly extending flanges 89 that are received between the flanges 83 and the body portions of the wedging members 72 and 73, said flanges having openings 90 therein, through which said bolt-like members 87 extend. Said openings 90 are in the form of inclined slots that are arranged all at the same angle to the forward faces 91 of said gate, or closure members, 80, the slots of opposed gate members approaching each other toward the mid-portion of said gate members 80.

It will be seen that, due to the connection provided by means of the bolt-like members 87 between the wedging members and the gate, or valve closure members, 80, said gate, or valve closure members, will be held against rotation with the valve stem by means of the projections 84. It will also be noted that when said wedging members 72 and 73 are moved toward each other by rotation of the shaft 33, the inclined faces thereof, engaging with the corresponding inclined faces of the gate members 80, will move the gate members 80 outwardly away from each other toward the valve seats 92, said valve seats being annular, or ring-like members, that are provided with screw-threads 93, that engage the screw-threaded portions 94 on the valve body 20, and with flat valve seat portions 95.

The valve closure members, or gate members, 80 are provided with annular grooves 96, in which are seated the inwardly directed annular flanges 97 provided on the sealing member 98 that have flat faces that are adapted to closely engage the flat sealing faces 95 on the valve seat members 92, and it will be obvious that as the wedging members 72 and 73 move the members 80 outwardly away from each other, this movement will continue until the sealing members on the gate, or closure, members 80, snugly engage the valve seats provided on the casing. To open the valves a reverse movement of the rotatable member 45 is used, and the wedging members 72 and 73 will move away from each other, moving along the inclined faces 78 and 79 of the gate members 80. However, this will not positively withdraw the sealing rings on the gate, or closure, members 80 from the valve seats without the provision of the members 87 operating in the slots 90. As the bolt-like members 87 move toward the remote ends of the slots 90 as said wedging members 72 and 73 move away from each other, said bolt-like members 87 being spaced a fixed distance apart, this will draw the gate, or closure, members 80 toward each other and out of engagement with the valve seats.

As the valves forming the subject matter of this invention, are usually of very large size, and consequently very heavy, means must be provided for handling the same, and the body portion of the valve is provided with a pair of fins 99 having openings 100 therein, with which hoisting means may be engaged to raise and lower the valve into position. Fins 101 are also provided on the cap portion 23 to strengthen the same. It is, of course, obvious that after the gate members of the valve have been moved to the position shown in Fig. 1, the slide 52 is moved to its alternative position from that shown in Figs. 1 and 7 and the hand wheel 45 is rotated to move the valve stem 38 lengthwise of itself, moving the valve mechanism upwardly into the chamber 22 so as to provide a passage through the valve from one opening 21 to the other opening 21 that is clear of all obstruction.

Figure 12:
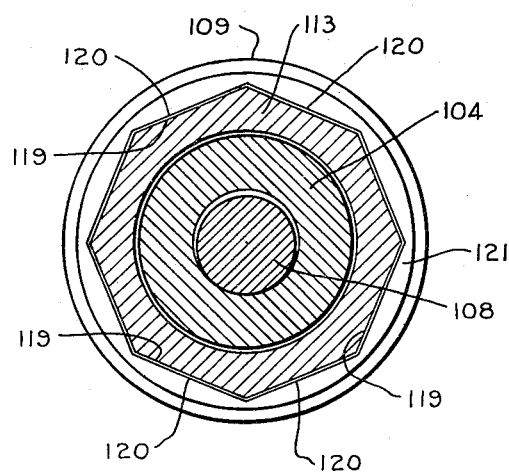
Fig. 12 is a section taken on the line 12—12 of Fig. 11, the valve casing being omitted.

In the form of the invention shown in Figs. 9 and 12, inclusive, the body portion 20' of the valve is made in the same manner as previously described, having the openings 21' therein providing a passage through the valve, and a chamber 22', similar to the chamber 22 previously described. The valve stem 33' is constructed in the same manner as the valve stem 33 where it passes through the member 23, and is provided with the same means for rotating the same and moving the same longitudinally, as is described in connection with Fig. 1. The lower end of the valve stem 33 is, however, provided with a worm 102 thereon, which engages with a worm wheel 103, formed by means of teeth cut into the central portion of the outer surface of a sleeve-like member 104. Said sleeve-like member 104 is provided with internally threaded portions 105 and 106, the thread 106 extending in an opposite direction to the thread 105, and the threads 105 meshing with corresponding external threads 107 on the boss 108 formed on the valve closure member, or gate member, 109 and the threads 106 meshing with threads 110, corresponding to the threads 106 on a boss 111 provided on the valve closure member, or gate, 112. The members 109 and 112 are exactly the same in construction except for the fact that the threads on the boss on the one member extend in a reverse direction from those on the boss on the other gate member.

A guide member 113 is provided that has the projections 115 thereon that engage in the groove 116 provided in the one side of the body portion 20' and in the groove 117 provided between a pair of ribs 118 on the other side of the body portion 20'. The guide member 113 has a polygonal outer surface at the opposite ends thereof providing a plurality of flat faces 119 thereon. The gate members, or closure members, 112 and 109 have polygonal socket portions having corresponding flat faces 120 thereon, said socket portions being formed by means of the annular ribs, or flanges, 121 provided on said members 109 and 112 that embrace the polygonal end portions of the member 113. Thus the gate members, or closure members, 109 and 112 are held from rotation relative to the guide member 113 and the guide member 113 is guided in its longitudinal movements into and out of the passage 22' by means of the ribs, or projections, 115 thereon. One side of the member 113 is enlarged, as indicated at 122 to provide a space therein for reception of the worm 102 and to provide a mounting for thrust bearings 123 for said shaft, said thrust bearings comprising body portions that are screw-threadedly engaged with the screw-threaded portion 124 of the enlargement 122, and held in fixed position by means of the set screws 125. Said thrust bearings further comprise the rings, or washers, 126 of anti-friction metal, and similar rings, or washers, 127, between which the bearing balls 138 are mounted.

The member 113 is further provided with an annular flange 128 that engages the shoulder 129 provided between the main body portion of the member 104 and the reduced end portion 130 thereof, thus holding said member 104 from endwise movement relative to the member 113 in one direction. A ring 131 is provided that has external screw-threads thereon that engage with the internally screw-threaded portion 132 on the member 113 at the opposite end thereof, said ring 131 engaging a shoulder 129 provided between the reduced end portion 130 on the corresponding end of the member 104 and the main body portion of said member 104. Thus the ring member 131 and the flange 128 confine the member 104 from endwise movement relative to the member 113, but permit free rotation of said sleeve 104 within the guide member 113. Set screws 133 are provided to lock the ring-like member 131 in position so as to prevent any accidental unscrewing thereof from the member 113.

It will be obvious that upon rotation of the shaft 33' in one direction the sleeve 104 will be rotated in one direction, and upon rotation of the shaft 33' in the opposite direction, the sleeve 104 will be rotated in the opposite direction. It will also be obvious that as the member 104 is rotated in one direction the members 109 and 112 will be moved away from each other, in view of the fact that the same are held from rotation with the sleeve 104, due to the polygonal engaging portions on the members 109 and 112 and the member 113, and that upon rotation of the sleeve-like member in the opposite direction the members 109 and 112 will be moved toward each other.

Each of the members 109 and 112 is provided with an annular conical sealing face 134, which engages with a correspondingly shaped valve seat 135 on the valve seat ring 92', which is similar to the member 92, previously described, and secured in position in a similar manner in the body of the valve. It is, of course, to be understood that the shaft 33' does not extend centrally of the opening 22', but at one side thereof, and that the upper mounting for the valve stem and its rotatable operating means will be correspondingly offset to one side of the valve structure. However, the construction and operation thereof is the same as previously described. The valve will operate in a similar manner to that previously described. The rotation of the hand wheel, or rotatable operating member, 45, while the slide has the squared part of the opening in engagement with the reduced end portion 58 of the valve stem, will rotate the valve stem 33', and thus move the valve closure members 109 and 112 either toward or away from each other, and either into engagement with, or away from the valve seats, while upon movement of the slide member to its alternative position, rotation of the hand wheel, or rotatable operating member, 45 will cause longitudinal movement of the valve stem 33' and move the valve mechanism bodily, either into close relation to the valve seats, such as the position shown in Fig. 9, or out of such position, so as to provide a free passage from the passage 21' on one side of the valve to the passage 21' on the other side of the valve.

In the case of the valve mechanism shown in Figs. 9 to 12, inclusive, the operation of the worm and worm wheel as a self-locking operating means, will prevent rotation of the sleeve 104 and of the valve stem 33' when there is no positive drive, such as obtained by the engagement of the squared portion of the opening in the slide 52 with the squared end of the stem 58, aided, of course, by the friction created by the packing material previously mentioned. Similarly, in the valve mechanism shown in Figs. 1 to 8, inclusive, the wedging members that are in engagement with the wedging faces on the gate members 80 will offer such resistance to their movement, due to the friction between the faces, as to aid the packing material 32 in preventing rotation of the valve stem 33 when longitudinal movement only thereof is desired, and will only operate upon positive rotation of the valve stem by engagement of the squared portion of the slide 52 with the squared portion 58 on the end of the valve stem 33.

What I claim is:

1. In a valve, a casing, valve mechanism within said casing, a stem projecting from said casing, rotatable means, means for connecting said rotatable means with said stem to either move said stem longitudinally without rotating said stem or rotate said stem without moving said stem longitudinally, and a controlling member for said connecting means slidably mounted on said rotatable means and having a position in which said stem rotates with said rotatable means and a position in which said rotatable means rotates relative to said stem, said controlling member being movable from one position to the other position thereof only in one position of said valve stem.

2. In a valve, a casing, valve mechanism within said casing, a stem projecting from said casing, beveled valve seats in said casing, said valve mechanism comprising closure members having beveled faces, said closure members being movable toward and away from said seats, and longitudinally with said stem, rotatable operating means engaging said stem, said stem being provided with means for moving said stem longitudinally upon rotation of said operating means and with means for rotating said stem upon rotation of said operating means, said valve mechanism comprising means for moving said closure members toward or away from said seats by rotation of said stem, said closure members being movable into and out of position opposite said seats by movement in the direction of length of said stem, and a controlling member adjustable upon said closure members reaching a position opposite said seats to hold said closure members from movement in the direction of length of said stem during movement thereof toward or away from said seats.

3. In a valve, a casing, valve mechanism within said casing, a stem projecting from said casing, beveled valve seats in said casing, said valve mechanism comprising closure members having beveled faces, said closure members being movable toward and away from said seats, and longitudinally with said stem, means for moving said closure members toward or away from said seats by rotation of said stem, said closure members being movable into and out of position opposite said seats by movement in the direction of length of said stem, and a controlling member engageable with said stem only when said closure members are opposite said valve seats to hold said closure members from movement in the direction of length of said stem during movement thereof toward or away from said seats.

4. In a valve, a casing, valve mechanism within said casing, a stem projecting from said casing, valve seats in said casing, said valve mechanism comprising closure members movable toward and away from said seats, and longitudinally with said stem, means for moving said closure members toward or away from said seats by rotation of said stem, said closure members being movable into and out of position opposite said seats by movement in the direction of length of said stem, and means controlling the movement of said stem responsive to said operating means, comprising a slide on said operating means having a portion within which said stem rotates and a portion interlocking with a portion of said stem, said slide being movable transversely of said stem from one alternative position to the other alternative position thereof only in one position of said stem whereby said closure members can be moved toward said seats only after said closure members are in position opposite said seats and in transverse alignment therewith.

5. In a valve, a casing, valve mechanism within said casing, a stem projecting from said casing, said stem having a threaded portion, a rotatable operating member having threaded means thereon engaging said threaded portion of said stem to move said stem axially through said operating member upon rotation of said operating member and inter-engageable means on said stem and said operating member to rotate said stem and operating member in unison, said inter-engageable means comprising a member slidably mounted on said operating member and movable into inter-engagement with said stem in only one position of said stem relative to said operating member.

6. In a valve, a casing, valve mechanism within said casing, a stem projecting from said casing, said stem having a threaded portion, a rotatable operating member having threaded means thereon engaging said threaded portion of said stem to move said stem axially upon rotation of said operating member, a reduced polygonal end portion on said valve stem, and a transversely movable member on said operating member having an opening therein through which said valve stem is adapted to pass and having means thereon engageable only with the polygonal portion of said valve stem to rotate said stem and operating member in unison, said operating member engaging a shoulder on said stem to hold said stem from endwise movement when said means is in engagement with said polygonal portion.

7. In a valve, a casing, valve mechanism within said casing, a stem projecting from said casing, rotatable means externally of said casing for either rotating said stem or moving the same lengthwise of itself, said valve mechanism comprising a pair of gate members on said stem, said stem having a pair of spaced annular shoulders thereon to define a groove, means on said gate members seated in said groove, a pair of wedging members on said stem engaging said gate members, said gate members and wedging members being mounted to move in unison with said stem upon movement of said stem lengthwise of itself without changing the relative positions of said gate members and wedging members, valve seats in said casing, said gate members having inclined slots therein, means on said wedging members extending through said slots, and threaded means positively moving said wedging members toward each other upon rotation of said stem in one direction to move said gate members toward said seats, and positively moving said wedging members away from each other upon rotation of said stem in the opposite direction to cause said means extending through said slots to move said gate members away from said seats, comprising threaded stem portions of different diameters, the smallest thereof being adjacent the end of said stem within said casing.

8. In a valve, a casing, valve mechanism within said casing, a stem projecting from said casing, rotatable means externally of said casing for either rotating said stem or moving the same lengthwise of itself, said valve mechanism comprising a pair of gate members on said stem, valve seats in said casing, and means on said stem for moving said gate members toward and away from said seats, said gate members and said means for moving the same being movable as a unit with said stem lengthwise thereof, said means for moving said gate members toward and away from said seats, comprising a pair of oppositely threaded members on said gate members, a sleeve having oppositely threaded portions cooperating therewith, a member surrounding said sleeve and engaging said gate members to hold the same against rotation with said sleeve to positively move said gate members toward each other upon rotation of said stem in one direction and to positively move the same away from each other upon rotation of said stem in the opposite direction, and a self-locking driving connection between said screw-threaded means and said stem.

9. In a valve, a casing, valve mechanism within said casing, a stem projecting from said casing, rotatable means externally of said casing for either rotating said stem or moving the same lengthwise of itself, said valve mechanism comprising a pair of gate members on said stem having beveled faces, valve seats in said casing having beveled faces, and means on said stem for moving said gate members toward and away from said seats, said gate members and said means for moving the same being movable as a unit with said stem lengthwise thereof, said means for moving said gate members toward and away from said seats, being positively driven to positively move said gate members toward said seats without any movement of said gate members in the direction of the length of said stem upon rotation of said stem in one direction and to positively move said gate members away from said seats without any movement of said gate members in the direction of the length of said stem upon rotation of said stem in the opposite direction, and connecting means on said rotatable means and said stem adjustable to connect the same to rotate said stem only after said gate members are aligned with said seats.

10. In a valve, a casing, valve mechanism within said casing, a stem projecting from said casing, rotatable means externally of said casing for either rotating said stem or moving the same lengthwise of itself, said valve mechanism comprising a pair of gate members on said stem, a rotatable member having a right screw-threaded connection with one of said gate members and a left-screw-threaded connection with the other of said gate members, means on said stem holding said gate members from rotation with said rotatable member and a worm drive connection between said rotatable member and said valve stem.

11. In a valve, a casing, valve mechanism within said casing, a stem projecting from said casing, rotatable means externally of said casing for either rotating said stem or moving the same lengthwise of itself, said valve mechanism comprising a pair of gate members on said stem, a rotatable member having a right screw-threaded connection with one of said gate members and a left screw-threaded connection with the other of said gate members, a guiding member for said gate members engaging said gate members to hold the same against rotation with said rotatable member, and a worm drive connection between said rotatable member and said valve stem, comprising a worm on said stem and a worm wheel portion on said rotatable member.

12. In a valve, a casing, valve mechanism within said casing, a stem projecting from said casing, rotatable means externally of said casing for either rotating said stem or moving the same lengthwise of itself, said valve mechanism comprising a carrier member mounted for guided movement in the direction of length of said stem in said casing, said stem being rotatably mounted in said carrier member, a pair of gate members slidably non-rotatably mounted on said carrier member, a sleeve rotatably mounted in said carrier member having a right screw-threaded connection with one of said gate members and a left screw-threaded connection with the other of said gate members and a worm drive connection between said rotatable sleeve and said valve stem.

13. In a valve, a casing, valve mechanism within said casing, a stem projecting from said casing and rotatable means externally of said casing for either rotating said stem or moving the same lengthwise of itself, said valve mechanism comprising a carrier member mounted on said stem, means on said carrier member and said casing for guiding said carrier member for movement in the direction of length of said stem, means in said carrier member for mounting said stem rotatably therein and holding said carrier member against axial movement relative to said stem, said carrier member having flattened portions thereon, a pair of gate members slidably mounted on said carrier member and having socket portions having flattened portions cooperating with the flattened portions on said carrier member to hold said gate members from rotation on said carrier member, said carrier member having a bore therethrough, a sleeve journalled in said bore, said sleeve having oppositely internally threaded portions, oppositely threaded projections on said gate members cooperating with the threaded portions of said sleeves and a selflocking driving connection between said stem and said sleeve to rotate said sleeve upon rotation of said stem.

14. In a valve, a casing, valve mechanism within said casing, a stem projecting from said casing and rotatable means externally of said casing for either rotating said stem or moving the same lengthwise of itself, said valve mechanism comprising a carrier member mounted on said stem, means on said carrier member and said casing for guiding said carrier member for movement in the direction of length of said stem, means in said carrier member for mounting said stem rotatably therein and holding said carrier member against axial movement relative to said stem, said carrier member having polygonal projecting formations thereon, a pair of gate members slidably mounted on said carrier member and having polygonal socket portions receiving said polygonal formations on said carrier member to hold said gate members from rotation on said carrier member, said carrier member having a bore therethrough, a sleeve journalled in said bore, said sleeve having oppositely internally threaded portions, oppositely threaded projections on said gate members cooperating with the threaded portions of said sleeves and a selflocking driving connection between said stem and said sleeve to rotate said sleeve upon rotation of said stem.

JOHN J. STINES.